United States Patent
Taguchi et al.

(10) Patent No.: US 8,307,927 B2
(45) Date of Patent: Nov. 13, 2012

(54) ROTATING ELECTRICAL MACHINE CONTROL SYSTEM AND VEHICLE DRIVE SYSTEM INCLUDING ROTATING ELECTRICAL MACHINE CONTROL SYSTEM

(75) Inventors: Shin Taguchi, Nagoya (JP); Kohei Ito, Anjo (JP); Kenji Suzuki, Nagoya (JP)

(73) Assignee: Aisin AW Co., Ltd., Anjo (JP)

( * ) Notice: Subject to any disclaimer, the term of this patent is extended or adjusted under 35 U.S.C. 154(b) by 663 days.

(21) Appl. No.: 12/292,110

(22) Filed: Nov. 12, 2008

(65) Prior Publication Data

US 2009/0120701 A1    May 14, 2009

(30) Foreign Application Priority Data

Nov. 14, 2007   (JP) .................. 2007-295986

(51) Int. Cl.
*B60W 10/08*   (2006.01)
(52) U.S. Cl. .............. 180/65.285; 318/434; 318/400.22; 318/432
(58) Field of Classification Search ............... 180/65.21, 180/65.285, 65.275
See application file for complete search history.

(56) References Cited

U.S. PATENT DOCUMENTS

| | | | |
|---|---|---|---|
| 5,923,135 A | 7/1999 | Takeda | |
| 2003/0034187 A1* | 2/2003 | Hisada et al. | 180/65.1 |
| 2005/0055141 A1 | 3/2005 | Suzuki et al. | |
| 2006/0219471 A1 | 10/2006 | Hayashi | |
| 2009/0120701 A1* | 5/2009 | Taguchi et al. | 180/65.285 |

FOREIGN PATENT DOCUMENTS

| | | |
|---|---|---|
| DE | 10 2004 042 760 A1 | 5/2005 |
| JP | A 09-215388 | 8/1997 |
| JP | A 10-164703 | 6/1998 |
| JP | A-2003-61203 | 2/2003 |
| JP | A-2005-86848 | 3/2005 |
| JP | A-2006-149064 | 6/2006 |
| JP | A-2006-280168 | 10/2006 |
| JP | A-2007-98981 | 4/2007 |
| JP | A-2007-202311 | 8/2007 |
| JP | A-2007-244072 | 9/2007 |
| WO | WO 2007/086235 | 8/2007 |

OTHER PUBLICATIONS

Bonert et al., "Self controlled induction motor drive with variable dc link voltage," *Industry Applications Society Annual Meeting*, 1993, vol. 1, pp. 651-654. Blasko et al., "On line thermal model and thermal management strategy of a three phase voltage source inverter," *Record of the Industry Applications Conference*, 1993, vol. 2, pp. 1423-1431.
Office Action issued in German Application No. 11 2008 001 444.2 dated May 23, 2012 (with translation).

* cited by examiner

*Primary Examiner* — J. Allen Shriver, II
*Assistant Examiner* — Erez Gurari
(74) *Attorney, Agent, or Firm* — Oliff & Berridge, PLC

(57) ABSTRACT

A rotating electrical machine includes a DC power supply; a rotating electrical machine; an inverter provided between the DC power supply and the rotating electrical machine to control current flowing in the rotating electrical machine; and a control device that: determines a rotational speed as a rotational speed requested for the rotating electrical machine and a requested torque as a torque requested for the rotating electrical machine; and limits a torque of the rotating electrical machine. The inverter is operated based on the rotational speed and the requested torque determined by the control device, and the control unit changes a limit of the torque in accordance with an inverter voltage which is a voltage applied to a frequency conversion portion provided in the inverter.

17 Claims, 8 Drawing Sheets

F I G . 1
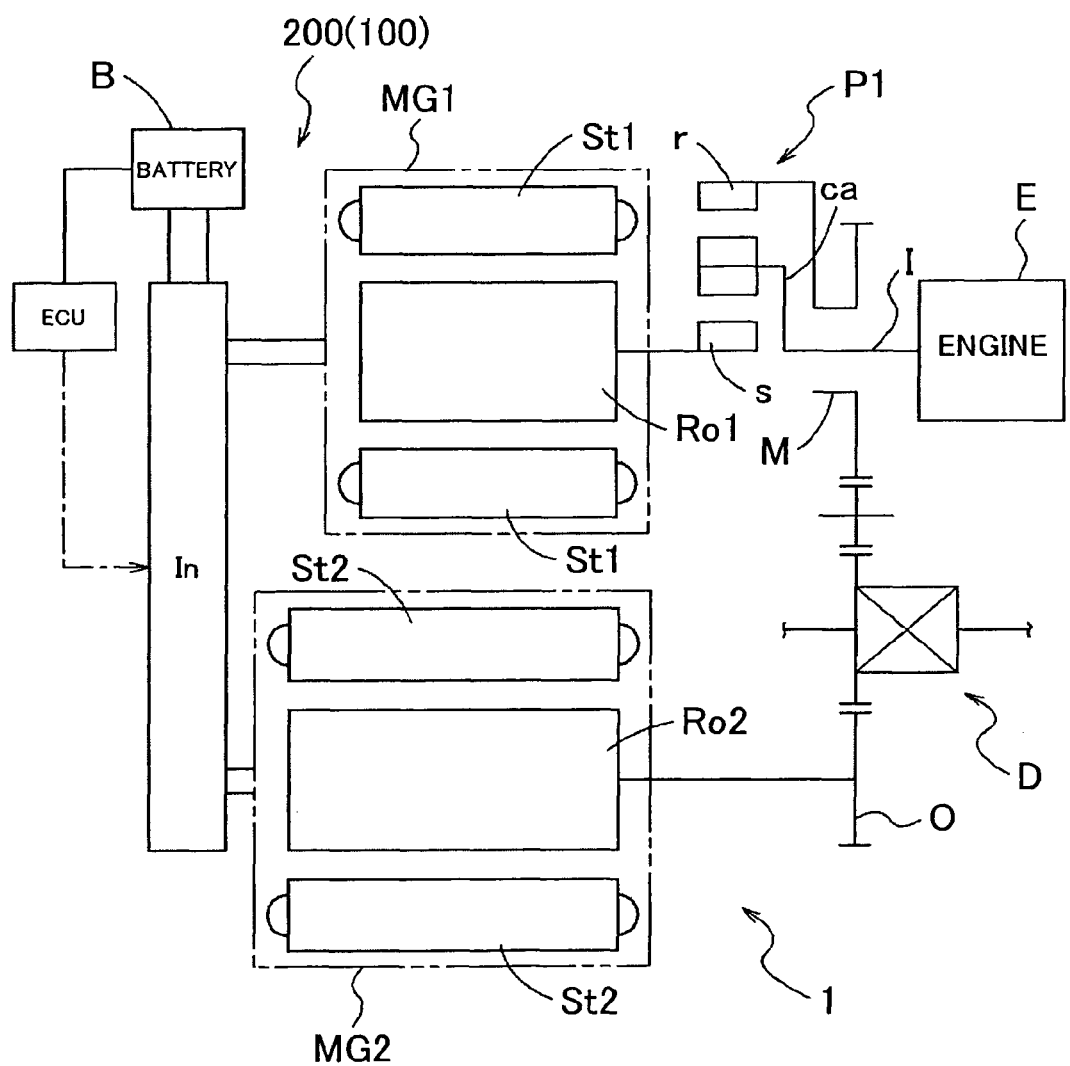

exemplary aspect of the invention, a rotat-
ROTATING ELECTRICAL MACHINE CONTROL SYSTEM AND VEHICLE DRIVE SYSTEM INCLUDING ROTATING ELECTRICAL MACHINE CONTROL SYSTEM

INCORPORATION BY REFERENCE

The disclosure of Japanese Patent Application No. 2007-295986 filed on Nov. 14, 2007 including the specification, drawings and abstract is incorporated herein by reference in its entirety.

BACKGROUND

The present invention relates to a rotating electrical machine control system, a vehicle drive system and a temperature estimation method There exists a rotating electrical machine control system that limits the torque of a rotating electrical machine based on the temperature of a coolant that cools an inverter device (which is an example of an inverter in the present invention) in Japanese Patent Application Publication No. JP-A-2005-86848.

JP-A-2005-86848 relates to, for example, an electric automobile including a motor as a drive source, in which a control device for the inverter device includes a cooling medium temperature detection unit that detects the coolant temperature and a torque limit unit that limits an output torque of the motor when a vehicle comes to a stalled state. The torque limit unit limits the output torque based on the coolant temperature.

In JP-A-2005-86848, since the torque limitation is performed in accordance with the coolant temperature, a switching element can be protected more effectively in accordance with the state of a cooling unit compared to a configuration in which the temperature of a particular portion of the inverter device is simply detected to execute the torque limitation.

Nowadays, in relation to environmental issues, hybrid vehicles that include both an engine and a rotating electrical machine as drive sources and which drive while appropriately selecting and determining the operation states of both drive sources in accordance with the driving state are attracting attention.

Japanese Patent Application Publication No. JP-A-2006-149064 shows a rotating electrical machine control system provided in such hybrid vehicles. A vehicle described in JP-A-2006-149064 includes an engine and a pair of motors as drive sources. In the technology disclosed in JP-A-2006-149064 as well, a cooling device that cools an inverter device is provided, and the load rate of a rotating electrical machine drive system is reduced in accordance with the fluctuation in cooling performance of the cooling device. Specifically, current flowing in an inverter is reduced (to consequently perform the torque limitation described above).

The rotating electrical machine drive system disclosed in Japanese Patent Application Publication No. JP-A-2006-149064 includes a DC power supply, a voltage conversion portion, and an inverter (as an example of a frequency conversion portion in the present invention) for executing a DC-to-AC conversion. The voltage conversion portion increases the power supply voltage, and the inverter performs conversion to an AC current and supplies the AC current of a predetermined current value to the motor at a predetermined frequency. Thus, the motor rotates at a rotational speed in accordance with the frequency of the supplied current, and generates a torque in accordance with the current value. In the rotating electrical machine control system provided in the hybrid vehicle including the voltage conversion portion, the voltage (which is called an inverter voltage in the present invention and is also the voltage applied to the motor) applied to the frequency conversion portion may reach as high as about twice a battery voltage after the voltage increase.

SUMMARY

FIGS. 10 and 11 of the present invention show regions of the torque and the rotational speed possibly requested for the rotating electrical machine with different inverter voltages. The rotating electrical machine operates as a motor in a region where the torque is positive, and operates as a generator in a region where the torque is negative.

In FIG. 10, a region inside a shadowed arrow shows a region used where the rotating electrical machine operates as the generator in a state where the storage amount of the battery is decreased, indicating that there are situations where the inverter voltage becomes high. On the other hand, FIG. 11 shows a region used during a stall.

Generally, as the voltage input to a frequency conversion portion increases, the switching loss of the frequency conversion portion increases when the input voltage fluctuates.

However, in the technology disclosed in Japanese Patent Application Publication No. JP-A-2005-86848, the voltage applied to the inverter is not in any way taken into consideration in terms of the torque limitation. Rather, it is designed to execute a torque limit control well in advance to sufficiently protect the inverter even if the inverter voltage fluctuates. Thus, in relation to the inverter voltage, the capability of the rotating electrical machine drive system has not been sufficiently utilized. For example, in a vehicle including a rotating electrical machine, which operates as a motor, a requested torque requested for the rotating electrical machine is determined from driving conditions (vehicle speed, requested driving force, and the like) of the vehicle. In the case where the requested torque is to be limited, the limitation depends only on the temperature of the inverter, the coolant temperature, and the like. Therefore, there are cases where the torque limitation applies even in a situation where the inverter voltage is relatively low, the torque limitation is not required, and generating the requested torque does not cause any problems.

Further, in a system which increases the battery voltage and supplies the battery voltage to the frequency conversion portion as in the technology of Japanese Patent Application Publication No. JP-A-2006-149064, the range of the inverter voltage significantly increases from that of the related art. As a result, the fluctuation of the voltage applied to the frequency conversion portion tends to increase, and an appropriate torque limitation becomes necessary. However, since a start determination of the torque limitation and the torque limitation itself have been performed based on only the inverter temperature, the temperature of coolant which cools the inverter, and the like, the situation described above has been common, and there has been room for improvement in this regard as well.

In order to solve the problems described above, it is an object of the present invention to provide a rotating electrical machine control system which can operate a rotating electrical machine under operation conditions for the rotating electrical machine with minimum torque limitation and which can sufficiently protect an inverter that controls the rotating electrical machine. The present invention can also achieve various other advantages.

According to an exemplary aspect of the invention, a rotating electrical machine includes a DC power supply; a rotating electrical machine; an inverter provided between the DC power supply and the rotating electrical machine to control current flowing in the rotating electrical machine; and a control device that: determines a rotational speed as a rotational speed requested for the rotating electrical machine and a requested torque as a torque requested for the rotating electrical machine; and limits a torque of the rotating electrical machine. The inverter is operated based on the rotational speed and the requested torque determined by the control device, and the control unit changes a limit of the torque in accordance with an inverter voltage which is a voltage applied to a frequency conversion portion provided in the inverter.

According to an exemplary aspect of the invention, a temperature estimation method for a frequency conversion portion in a rotating electrical machine control system including: a DC power supply; a rotating electrical machine; an inverter provided between the DC power supply and the rotating electrical machine to control current flowing in the rotating electrical machine; and a control device that determines a rotational speed as a rotational speed requested for the rotating electrical machine and a requested torque as a torque requested for the rotating electrical machine, wherein the inverter is operated based on the rotational speed and the requested torque determined by the control device, the temperature estimation method includes estimating that a temperature increase rate of a switching element forming the inverter is faster with a higher inverter voltage which is a voltage applied to the frequency conversion portion provided in the inverter.

According to an exemplary aspect of the invention, a rotating electrical machine control system includes a DC power supply; a rotating electrical machine; an inverter provided between the DC power supply and the rotating electrical machine to control current flowing in the rotating electrical machine; and a control device that: determines a rotational speed as a rotational speed requested for the rotating electrical machine and a requested torque as a torque requested for the rotating electrical machine; and limits a torque of the rotating electrical machine. The inverter is operated based on the rotational speed and the requested torque determined by the control device, and the control unit changes a time at which the torque is limited and an amount by which the torque is limited in accordance with an inverter voltage which is a voltage applied to a frequency conversion portion provided in the inverter.

BRIEF DESCRIPTION OF THE DRAWINGS

Various exemplary aspects of the invention will be described with reference to the drawings wherein:

FIG. 1 is a view showing the outline of a drive system of a vehicle drive system according to the present invention;

DETAILED DESCRIPTION OF THE PREFERRED EMBODIMENTS

Hereinafter, one embodiment of a rotating electrical machine control system 100 according to the present invention will be described with reference to the drawings. The rotating electrical machine control system 100 is incorporated in a vehicle drive system 200 which is entirely shown in FIG. 3, and serves to perform operation control of rotating electrical machines MG1 and MG2 provided in the vehicle drive system 200.

Figure 2:
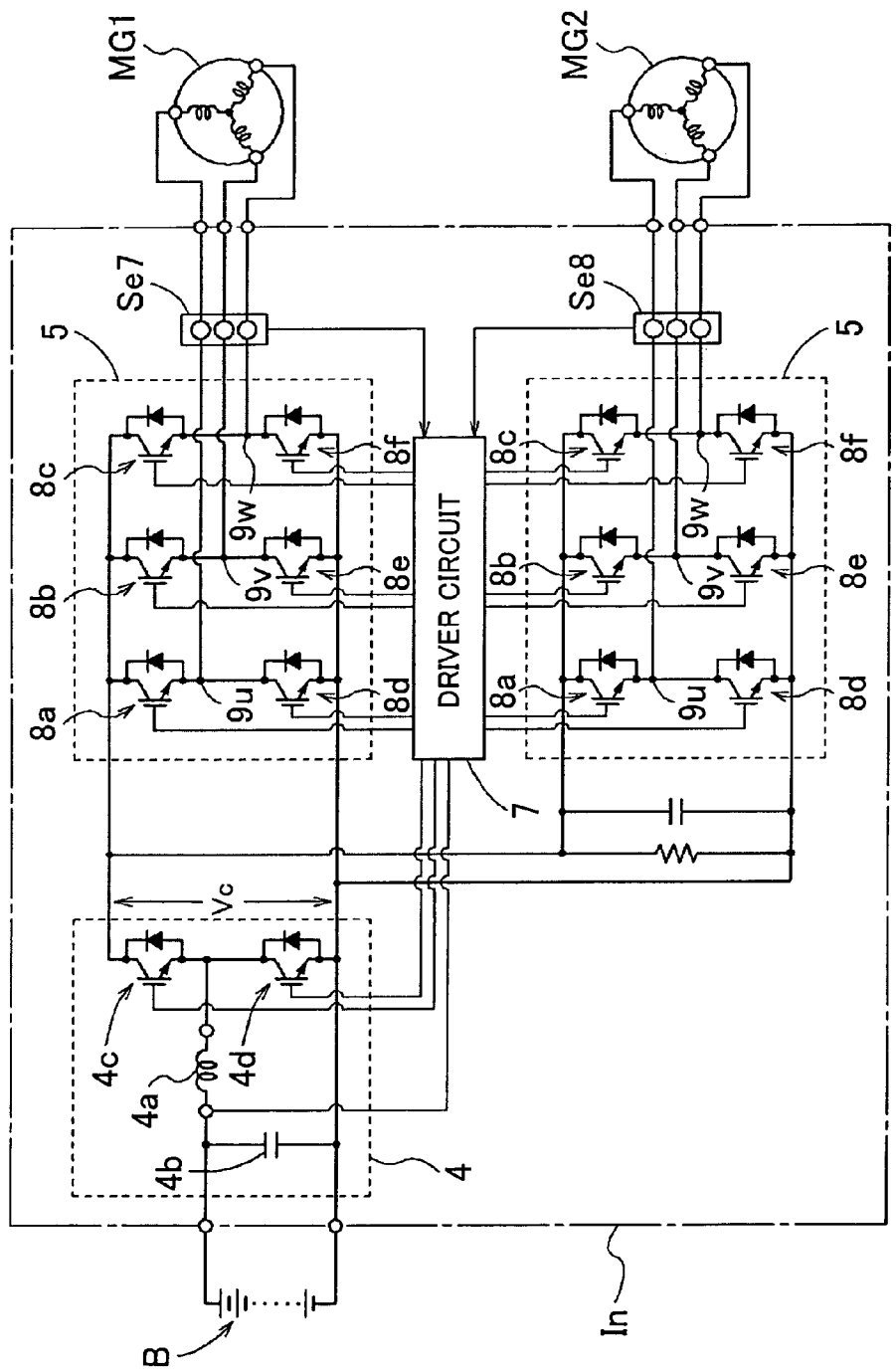
FIG. 2 is a view showing the outline of a rotating electrical machine control system of the vehicle drive system according to the present invention.
Figure 3:
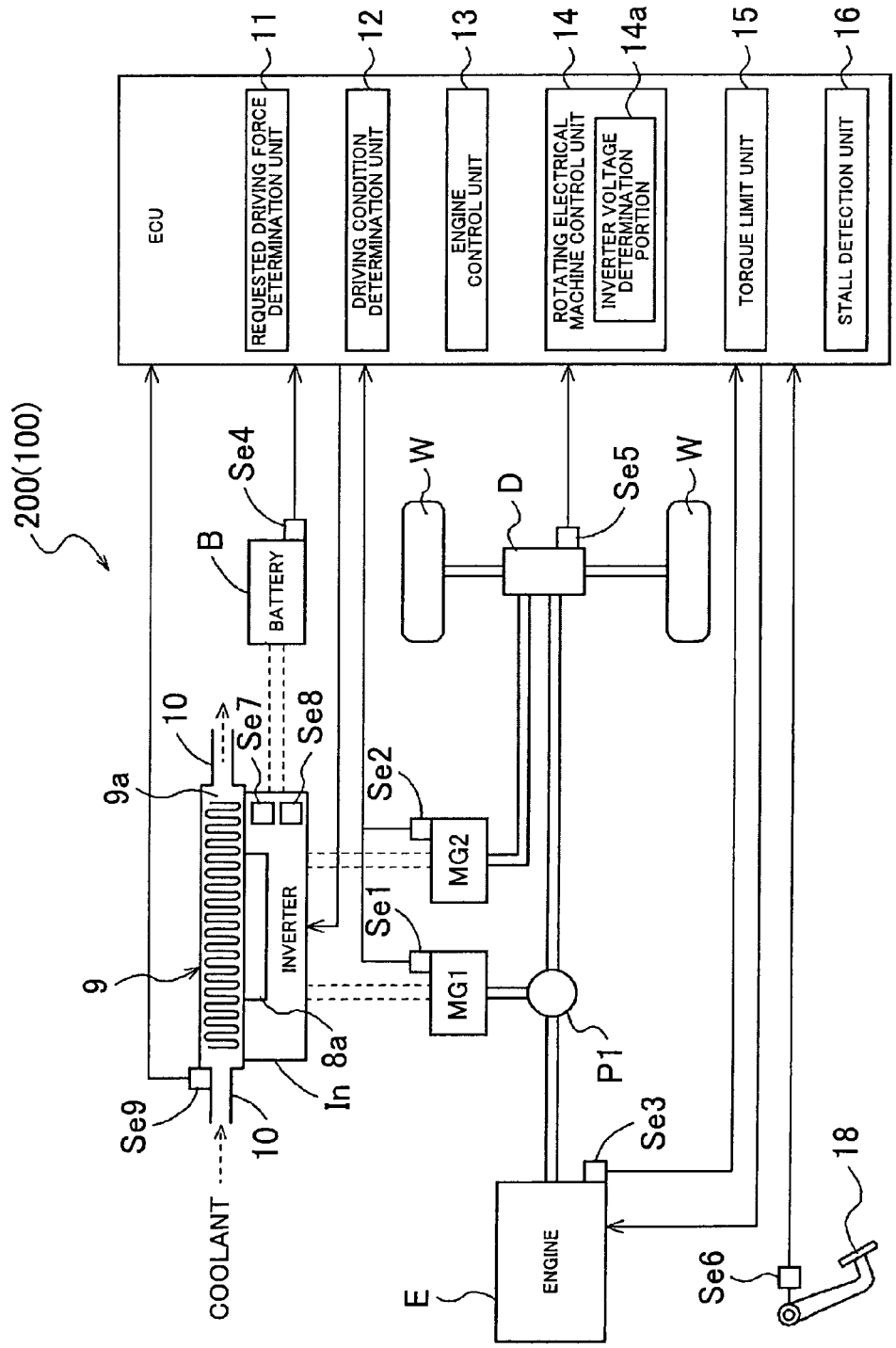
FIG. 3 is a view showing the entire outline of the vehicle drive system according to the present invention.

FIG. 1 is a view showing the outline of a drive system of the vehicle drive system 200. FIG. 2 is a view showing the outline of a rotating electrical machine control system in which an inverter In controls the rotating electrical machines MG1 and MG2. FIG. 3 is a view showing the entire outline of the vehicle drive system 200 including a control device ECU. In FIG. 3, solid line arrows show transmission routes of various information, double lines show a transmission route of driving force, and double dotted lines show a transmission route of electric power.

1-1. Drive System

As shown in FIGS. 1 and 3, a vehicle includes an engine E and a pair of the rotating electrical machines MG1 and MG2. The vehicle can be driven by obtaining a driving force from the engine E or the rotating electrical machine operating as a motor. At least a part of the driving force generated by the engine E is converted to electric power by the rotating electrical machine operating as a generator, and is used for charging a battery B or driving the rotating electrical machine operating as the motor. Further, at the time of braking, the braking force can be regenerated by the rotating electrical machine to be stored in the battery B as electric power.

The vehicle drive system 200 is a so-called hybrid system, and includes a hybrid drive device 1 between the engine E and a wheel W. As the engine E, various known internal combustion engines such as a gasoline engine or diesel engine may be used.

An input shaft I of the hybrid drive device 1 is connected to an output rotation shaft such as a crankshaft of the engine E. Note that a configuration in which the input shaft I is connected to the output rotation shaft of the engine E via a damper or a clutch there between is also preferable. An output shaft is connected to the wheel W via a differential device D or the like so as to be capable of transmitting a rotational driving force. Further, the input shaft I is connected to a carrier ca of a power distribution mechanism P1, and a middle shaft M connected to the wheel W via the differential device D is connected to a ring gear r.

The first rotating electrical machine MG1 includes a stator St1 and a rotor Ro1 rotatably supported on the inside of the stator St1 in the radial direction. The rotor Ro1 of the first rotating electrical machine MG1 is connected to rotate integrally with a sun gear s of the power distribution mechanism P1. The second rotating electrical machine MG2 includes a stator St2 and a rotor Ro2 rotatably supported on the inside of the stator St2 in the radial direction. The rotor Ro2 of the second rotating electrical machine MG2 is connected to rotate integrally with an output gear O, and is connected to the input side of the differential device D. As shown in FIGS. 1 and 3, the first rotating electrical machine MG1 and the second rotating electrical machine MG2 are electrically connected to the battery B via the inverter In. A structure in which the inverter In is cooled by heat exchange with a coolant is employed. The first rotating electrical machine MG1 and the second rotating electrical machine MG2 are respectively capable of serving as a motor (electric motor) that receives a supply of electric power to generate power and as a generator (electric generator) that receives a supply of power to generate electric power.

In this embodiment, the first rotating electrical machine MG1 mainly functions as a generator which performs electricity generation with the driving force input via the sun gear s of the power distribution mechanism P1 to charge the battery B or supply electric power for driving the second rotating electrical machine MG2. Note that the first rotating electrical machine MG1 may function as the motor when the vehicle is driving at high speed. On the other hand, the second rotating electrical machine MG2 mainly functions as the motor that assists the driving force for driving the vehicle. When the vehicle is decelerated or the like, the second rotating electrical machine MG2 functions as the generator, which regenerates electrical energy from the inertia force of the vehicle. The operations of the first rotating electrical machine MG1 and the second rotating electrical machine MG2 are performed in accordance with a control instruction from the control device ECU. In the descriptions below, reference symbols MG1 and MG2 may be omitted in the case where the first rotating electrical machine MG1 or the second rotating electrical machine MG2 is not to be specified in particular.

As shown in FIG. 1, the power distribution mechanism P1 is formed by a single-pinion type planetary gear mechanism arranged coaxially with the input shaft I. That is, the power distribution mechanism P1 includes the carrier ca that supports a plurality of pinion gears and the sun gear s and the ring gear r that respectively mesh with the pinion gears as rotational components. The sun gear s is connected to rotate integrally with the rotor Ro1 of the first rotating electrical machine MG1. The carrier ca is connected to rotate integrally with the input shaft I. The ring gear r is connected to rotate integrally with the middle shaft M. Accordingly, the ring gear r is connected to the differential device D via the middle shaft M. In this embodiment, the sun gear s, the carrier ca, and the ring gear r respectively correspond to a "first rotational component m1," a "second rotational component m2," and a "third rotational component m3" of the power distribution mechanism P1 of the present invention.

1-2. Rotating Electrical Machine Control System

FIG. 2 shows the operation control system of each rotating electrical machine with the inverter In playing a central role. A rotating electrical machine control system includes the battery B, the respective rotating electrical machines MG1 and MG2, and the inverter In mounted between the two. The inverter In includes a voltage conversion portion 4 and a frequency conversion portion 5 from the battery B side. As can be seen from FIG. 2, the frequency conversion portion 5 is provided separately for each of the pair of rotating electrical machines MG1 and MG2. Between the frequency conversion portion 5 and the respective rotating electrical machines MG1 and MG2, current sensors (a first rotating electrical machine current sensor Se7 and a second rotating electrical machine current sensor Se8) for measuring the current amount in the rotating electrical machines are provided.

The battery B described above is capable of supplying electric power to the rotating electrical machines MG1 and MG2 as well as receiving a supply of electric power from the rotating electrical machines MG1 and MG2 to store electricity.

In the inverter In, a voltage conversion circuit forming the voltage conversion portion 4 includes a reactor 4a, a filter capacitor 4b, and a pair of upper and lower switching elements 4c and 4d. As the respective switching elements 4c and 4d, MOS field-effect transistors (MOSFETs) may be employed.

The source of the upper switching element 4c is connected to the drain of the lower switching element 4d, and is connected to the plus side of the battery B via the reactor 4a. The drain of the upper switching element 4c is the input plus side of the frequency conversion portion 5. The gates of the upper switching element 4c and the lower switching element 4d are connected to a driver circuit 7, and the source of the lower switching element 4d is connected to a minus side (ground) of the battery B.

By performing PWM control of the switching elements 4c and 4d from the driver circuit 7 based on a requested voltage as a voltage instruction output from a rotating electrical machine control unit 14 described later, the voltage from the battery B is increased and supplied to the frequency conversion portion 5. On the other hand, in the case where electric power is received from the rotating electrical machine side, the voltage is decreased and supplied to the battery B.

An inverter circuit forming the frequency conversion portion 5 includes upper or lower switching elements 8a, 8b, 8c, 8d, 8e, and 8f. The MOS field-effect transistors (MOSFETs) may be employed also as the respective switching elements 8a, 8b, 8c, 8d, 8e, and 8f.

The upper switching elements 8a, 8b, and 8c have drains connected to the output plus side of the voltage conversion portion 4, gates connected to the driver circuit 7, and sources connected to the drains of the lower switching elements 8d, 8e, and 8f. The lower switching elements 8d, 8e, and 8f have gates connected to the driver circuit 7, and sources connected to the output minus side of the voltage conversion portion 4, that is, the minus side (ground) of the battery B.

Middle points 9u, 9v, and 9w of respective pairs of the upper and lower switching elements 8a and 8d, 8b and 8e, and 8c and 8f are respectively connected to coils of a U-phase, a V-phase, and a W-phase of the rotating electrical machines MG1 and MG2. The rotating electrical machine current sensors Se7 and Se8 detect electricity conducted to the respective coils, and the detected values are sent to the driver circuit 7 and to the control device ECU.

By performing PWM control of the switching elements 8a, 8b, 8c, 8d, 8e, and 8f from the driver circuit 7 based on the rotational speed and the requested torque output from the rotating electrical machine control unit 14 described later, the respective rotating electrical machines MG1 and MG2 are operated with the rotational speed and the requested torque (limit torque in the case of performing a torque limitation). In the case where the electric power is received from the rotating electrical machines MG1 and MG2 side, an AC-to-DC conversion is performed at a predetermined frequency.

Cooling Unit

As schematically shown in FIG. 3, the inverter In includes a heat exchanger 9 for lowering the temperatures of the respective switching elements 4c, 4d, 8a, 8b, 8c, 8d, 8e, and 8f which generate heat and become high in temperature due to the conducted electricity. The switching element 8a (other switching elements are omitted in the drawing) is secured adhesively on one side surface on the outside, and a coolant passage 9a in which the coolant as a cooling medium flows is formed on the inside of the heat exchanger 9. The entrance and exit of the coolant passage 9a are connected with one end and the other end of a coolant circulation path 10. The coolant circulation path 10 decreases the temperature of the high-temperature coolant sent from the heat exchanger 9, and returns the coolant decreased in temperature to the heat exchanger 9. In the entrance of the coolant passage 9a, a coolant temperature sensor Se9 that detects the temperature of the coolant is provided. The coolant temperature sensor Se9 sends the detected coolant temperature to the control device ECU.

1-3. Vehicle Drive System

Hereinafter, based on FIG. 3, the entire vehicle drive system 200 according to the present invention will be described, focusing on the control device ECU.

As shown in FIG. 3, the control device ECU performs the operation control of the engine E, the first rotating electrical machine MG1, the second rotating electrical machine MG2, and the like using information acquired by the sensors Se1 to Se9 provided on respective portions of the vehicle. The operation control of the first rotating electrical machine MG1 and the second rotating electrical machine MG2 is performed via the inverter In described above.

In this embodiment, as the sensors, a first rotating electrical machine rotational speed sensor Se1, a second rotating electrical machine rotational speed sensor Se2, an engine rotational speed sensor Se3, a battery state detection sensor Se4, a vehicle speed sensor Se5, an accelerator operation detection sensor Se6, the first rotating electrical machine current sensor Se7, the second rotating electrical machine current sensor Se8, and the coolant temperature sensor Se9 are provided.

The first rotating electrical machine rotational speed sensor Se1 is a sensor for detecting the rotational speed of the rotor Ro1 of the first rotating electrical machine MG1. The second rotating electrical machine rotational speed sensor Se2 is a sensor for detecting the rotational speed of the rotor Ro2 of the second rotating electrical machine MG2. The engine rotational speed sensor Se3 is a sensor for detecting the rotational speed of the output rotation shaft of the engine E. In the case of this embodiment, since the input shaft I rotates integrally with the output rotation shaft of the engine E, the rotational speed of the engine E detected by the engine rotational speed sensor Se3 coincides with the rotational speed of the input shaft I. The battery state detection sensor Se4 is a sensor for detecting the state such as the charged amount of the battery B. The vehicle speed sensor Se5 is a sensor for detecting the rotational speed of an input shaft (not shown) of the differential device D in order to detect the vehicle speed. The accelerator operation detection sensor Se6 is a sensor for detecting the operation amount of an accelerator pedal 18. The first rotating electrical machine current sensor Se7 and the second rotating electrical machine current sensor Se8 are provided in the inverter In to respectively detect the currents flowing in the first rotating electrical machine MG1 and the second rotating electrical machine MG2. The coolant temperature sensor Se9 is a sensor for detecting the temperature of the coolant.

The control device ECU includes a requested driving force determination unit 11, a driving condition determination unit 12, an engine control unit 13, and the rotating electrical machine control unit 14. Further, the control device ECU includes a torque limit unit 15 and a stall detection unit 16.

Each unit of the control device ECU is implemented by one or both of hardware and software (program) as a function portion for performing various processes on input data, with an arithmetic processing device such as a CPU serving as the core member.

The requested driving force determination unit 11 determines the requested driving force by a driver based on the outputs from the vehicle speed sensor Se5 and the accelerator operation detection sensor Se6.

The engine control unit 13 starts and stops the operation of the engine E, and performs the operation control such as rotational speed control and output torque control of the engine in accordance with the rotational speed and the output torque requested for the engine and determined by the driving condition determination unit 12. The rotating electrical machine control unit 14 performs the operation control such as the rotational speed control and torque control of the first rotating electrical machine MG1 and the second rotating electrical machine MG2 via the inverter In, in accordance with the rotational speed and the output torque requested for the respective rotating electrical machines MG1 and MG2 and determined by the driving condition determination unit 12.

The driving condition determination unit 12 determines the rotational speed (rotational speed ) and the output torque (requested torque) of the engine E and the rotational speed (rotational speed ) and the output torque (requested torque) of each of the first rotating electrical machine MG1 and the second rotating electrical machine MG2 as driving conditions requested for the vehicle, according to a map or the like provided in advance in accordance with information of the vehicle speed obtained by the vehicle speed sensor Se5, information of the requested driving force obtained by the requested driving force determination unit 11, information of the charged amount of the battery obtained by the battery state detection sensor Se4, and the like.

An example of determining the driving conditions described above by the driving condition determination unit 12 will be described. In the case where the storage amount of the battery B is sufficient, operation conditions by which the engine E can realize an optimum fuel efficiency are set as the rotational speed and the torque requested for the engine E, a shortage of torque with the operation condition of the engine E is set as the torque requested for the second rotating electrical machine MG2, and the torque distributed to the first rotating electrical machine MG1 side by the power distribution mechanism P1 is further set as the torque requested for the first rotating electrical machine MG1 (which is negative since the first rotating electrical machine MG1 operates as the generator in this state), for example. The rotational speeds to be achieved by the first rotating electrical machine MG1 and the second rotating electrical machine MG2 are determined as the rotational speed in accordance with a gear ratio or the like of gears provided in the configuration of the power distribution mechanism P1 and the drive system described above.

On the other hand, when the storage amount of the battery B is little and braking is applied to the vehicle, the operation conditions of the engine E, the first rotating electrical machine MG1, and the second rotating electrical machine MG2 are determined so as to increase the electric power generated by the first rotating electrical machine MG1 in a state where the rotational speed of the second rotating electrical machine MG2 operating as the motor is suppressed. In this case, the rotational speed of the wheel W and consequently the rotational speed of the second rotating electrical machine MG2 is decreased in a state where the braking is applied to the vehicle. By increasing the engine rotational speed in this state, the rotational speed of the first rotating electrical machine MG1 operating as the generator is increased due to the connection relation of the respective gears of the planetary gear in the power distribution mechanism P1. As a result, the electricity generation amount of the first rotating electrical machine MG1 is increased, enabling a charge of the battery B.

The rotational speed and the requested torque with respect to the engine E determined by the driving condition determination unit 12 are sent to the engine control unit 13, and the operation control is performed such that the engine E satisfies the rotational speed and the requested torque. The rotational speed and the requested torques for the first rotating electrical machine MG1 and the second rotating electrical machine MG2 are respectively sent to the rotating electrical machine control unit 14, where operation control information for the respective rotating electrical machines is generated, converted to a frequency instruction corresponding to the rotational speed and a current instruction corresponding to the requested torque, and sent to the inverter In to perform the operation control of each of the rotating electrical machines MG1 and MG2 via the driver circuit 7.

As shown in FIG. 3, the rotating electrical machine control unit 14 is provided with an inverter voltage determination portion 14a. As described above, the rotational speed and the requested torques of the respective rotating electrical machines MG1 and MG2 are sent from the driving condition determination unit 12 to the rotating electrical machine control unit 14. The inverter In employed in this embodiment includes the common voltage conversion portion 4, and the DC voltage (called the inverter voltage) converted by the common voltage conversion portion 4 is applied to the frequency conversion portion 5. The rotating electrical machine control unit 14 obtains the frequency and the current value of each rotating electrical machine required for the inverter In to control the rotating electrical machines MG1 and MG2 from the rotational speed and the requested torques requested for each of the rotating electrical machines MG1 and MG2. Further, the rotating electrical machine control unit 14 obtains the DC voltages (called a first voltage and a second voltage, respectively) required for the respective rotating electrical machines MG1 and MG2. The rotating electrical machine control unit 14 assumes the higher voltage of a pair of the obtained first voltage and second voltage as the inverter voltage.

Thus, the rotating electrical machine control unit 14 obtains the inverter voltage Vc as an instruction value for the inverter In, as well as the frequency and the current value of each of the rotating electrical machines MG1 and MG2, to be sent to the inverter In.

The description above has been made for a case where the engine E and the pair of rotating electrical machines MG1 and MG2 are operated directly in accordance with the driving conditions determined by the driving condition determination unit 12.

In the present invention, for cases where there is a possibility of the temperatures of the switching elements 8a, 8b, 8c, 8d, 8e, and 8f provided in the inverter In increasing in contrast to the normal driving state described above, the torque limit unit 15 which limits the torque of the rotating electrical machines MG1 and MG2 is provided. In the case where the torque of the rotating electrical machines MG1 and MG2 is limited, the torque to be requested for each of the rotating electrical machines MG1 and MG2 described above is a limit torque that is less than the requested torque described above by a predetermined amount.

Torque Limit Unit

The torque limit unit 15 is a unit that assumes the torque of the rotating electrical machine to be a limit torque Tr lower than a requested torque Tn determined by the driving condition determination unit 12 described above under a predetermined condition. In this embodiment, the torque limit unit 15 executes the torque limit control in the case where the predetermined condition is satisfied in accordance with at least the inverter voltage Vc and a coolant temperature ta. Specifically, in the case where the requested torque Tn is higher than a "continuously operable torque Tc" of the present invention, the torque limit control in this form causes the torque of the rotating electrical machine to be decreased to the limit torque Tr after a "continuously operable time Ti0" determined based on the requested torque has elapsed.

Start of Torque Limit Control

The torque limit unit 15 executes the torque limit control of limiting the torque of the rotating electrical machine in the case where the requested torque Tn requested for the rotating electrical machine is higher than the continuously operable torque Tc as a torque with which the rotating electrical machine can be operated continuously and which is determined based on the inverter voltage and the coolant temperature. In the case where the requested torque Tn is lower than the continuously operable torque Tc, the torque limit control is not performed, and the operation control of the rotating electrical machine is performed to generate the requested torque Tn required for the rotating electrical machine.

Figure 4:
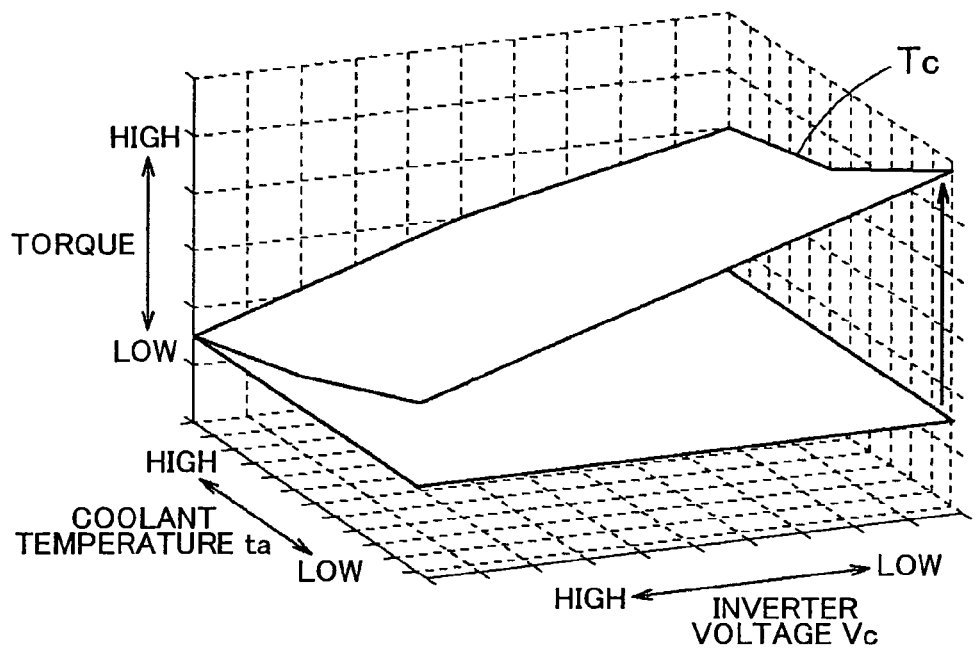
FIG. 4 is a view showing a map of a continuously operable torque.

The continuously operable torque Tc is an empirically obtained maximum torque with which the inverter can be continuously operated stably without overheating in the case where the rotating electrical machine is continuously operated with the torque of that value or a lower value. The continuously operable torque Tc is obtained in advance, and takes a value in accordance with the inverter voltage Vc and the coolant temperature ta as shown in FIG. 4. That is, the continuously operable torque Tc increases as the inverter voltage Vc or the coolant temperature ta decreases, and decreases as the inverter voltage Vc or the coolant temperature ta increases. The degree of influence of the inverter voltage Vc on the continuously operable torque is greater than the degree of influence of the coolant temperature ta.

Under a condition in which the continuously operable torque Tc is high, the operation of the rotating electrical machine can continue with the requested torque Tn even if the requested torque Tn requested for the rotating electrical machine is relatively high. Thus, by employing a structure in which the continuously operable torque Tc can be obtained in accordance with the inverter voltage Vc as in the present invention, the rotating electrical machine can be operated in accordance with the desired requested torque as much as possible. Torque limit control Further, the torque limit control by the torque limit unit 15 causes the torque of the rotating electrical machine to be limited to the limit torque Tr which is a torque lower than the requested torque Tn after the continuously operable time Ti0, which is changed in accordance with the inverter voltage Vc and the coolant temperature ta, has elapsed.

Figure 5:
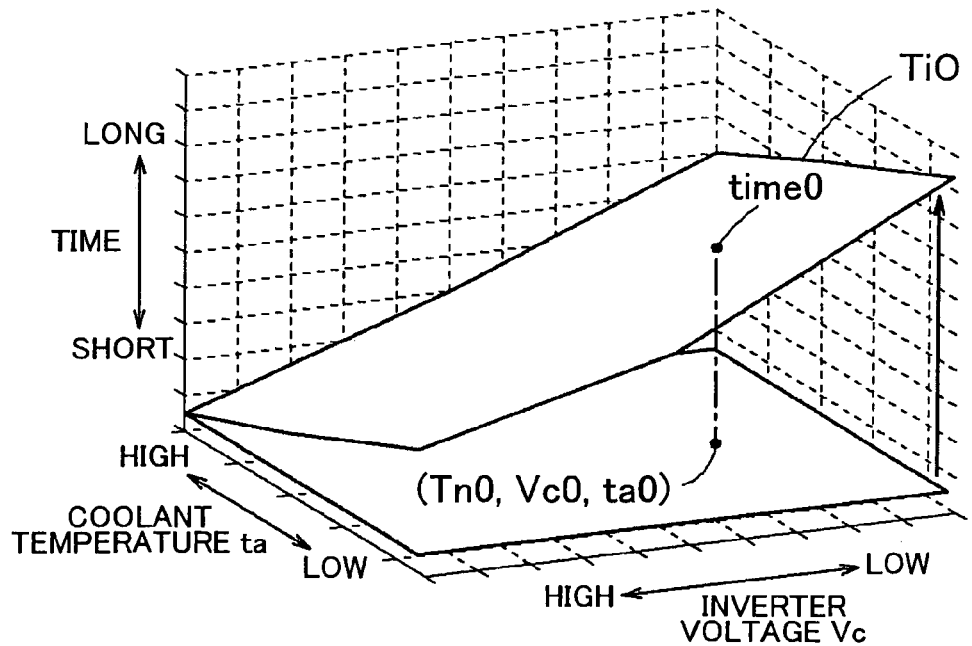
FIG. 5 is a view showing a map of a continuously operable time.

The continuously operable time Ti0 is an empirically obtained maximum time within which heat generation of the inverter does not cause problems in the inverter in the case of a continuous operation with a torque of a specific value such as the requested torque Tn, for example. The continuously operable time Ti0 is also obtained in advance, and takes a value in accordance with the inverter voltage Vc and the coolant temperature ta as shown in FIG. 5. That is, the continuously operable time Ti0 increases as the inverter voltage Vc or the coolant temperature ta decreases, and decreases as the inverter voltage Vc or the coolant temperature ta increases. The degree of influence of the inverter voltage on the continuously operable time is greater than the degree of influence of the coolant temperature. Note that, since the continuously operable time Ti0 is determined in correspondence with each torque value (FIG. 5 merely shows an example of a case where the torque has a specific value Tn0) and the requested torque Tn takes various values in reality, a map of the continuously operable time Ti0 as shown in FIG. 5 is prepared in accordance with continuous or discrete torque values regarding torques higher than the continuously operable torque Tc described above.

As can be seen from FIG. 5, the continuously operable time Ti0 is in accordance with the inverter voltage Vc and the coolant temperature ta. Even in the case where the requested torque Tn requested for the rotating electrical machine is higher than the continuously operable torque Tc, the continuously operable time Ti0 is greatly influenced by the inverter voltage Vc. In the case where the inverter voltage Vc is low, the continuous operation is possible for a relatively long time with the requested torque Tn. Thus, by obtaining the continuously operable time Ti0 in accordance with the inverter voltage Vc as in the present invention, the rotating electrical machine can be operated as long as possible and in accordance with the requested torque Tn.

Next, the torque limitation executed after the continuously operable time Ti0 has elapsed will be described.

Figure 8:
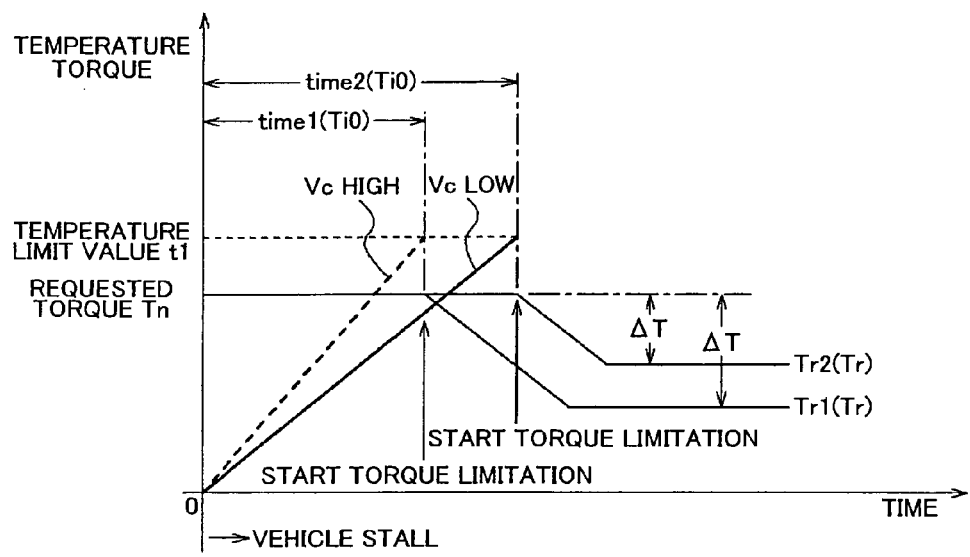
FIG. 8 is a view showing a torque limit control state in the case where the inverter voltage is not constant.
Figure 9:
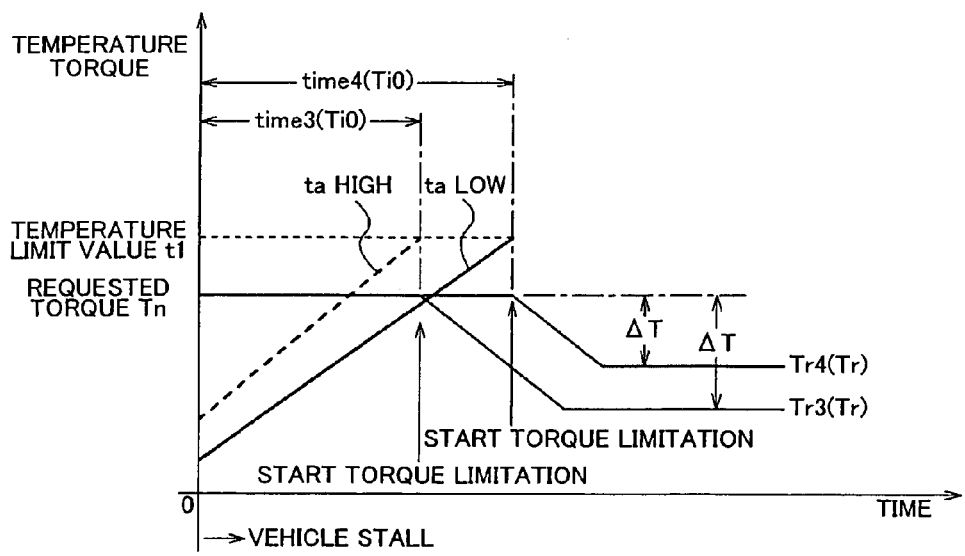
FIG. 9 is a view showing a torque limit control state in the case where a coolant temperature is not constant.
Figure 10:
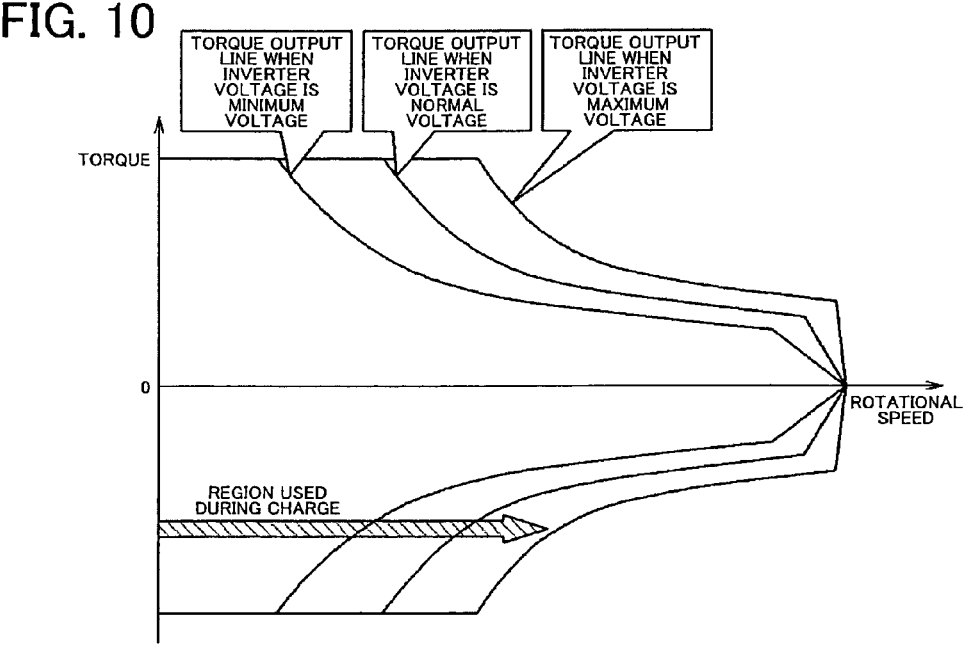
FIG. 10 is a view showing a change region of the torque and rotational speed when a battery is charged.
Figure 11:
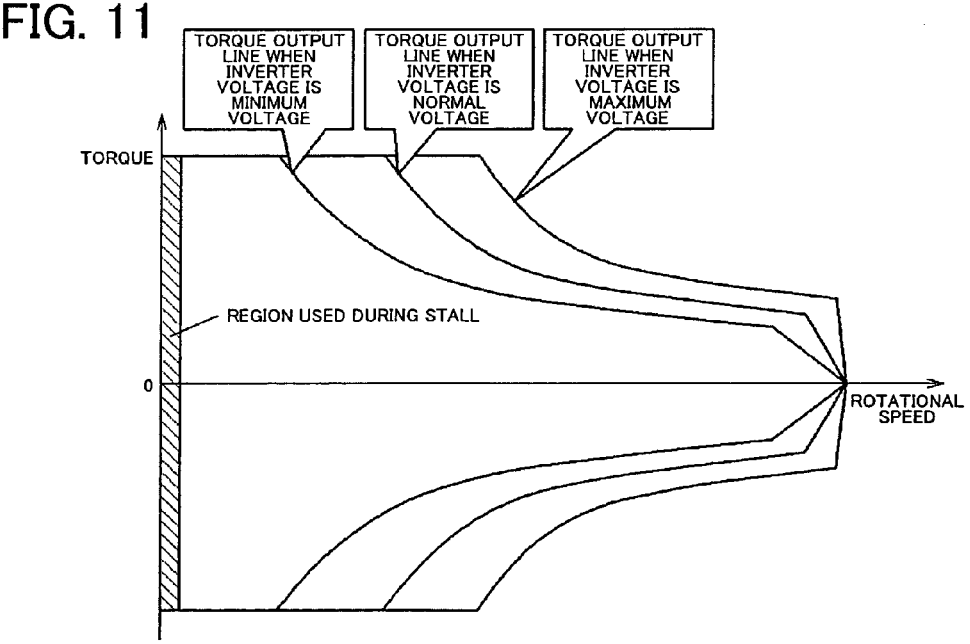
FIG. 11 is a view showing a change region of the torque and rotational speed in a stalled state.

When the continuously operable time Ti0 has elapsed, the inverter, which has been operated with a torque (for example, requested torque Tn) higher than the continuously operable torque Tc, reaches a temporary limit. As shown in FIGS. 8 and 9, in order to suppress the temperature increase of the inverter, the torque limitation is applied. That is, the torque of the rotating electrical machine for which the operation control is performed to output the requested torque Tn in the present state is limited to a torque (limit torque Tr) lower than this torque. In the present invention, the limit torque Tr also is in accordance with the inverter voltage Vc and the coolant temperature ta. That is, a reduction amount AT from the requested torque Tn to the limit torque Tr is set to be large in the case where the inverter voltage Vc or the coolant temperature ta is high, and to be small in the case where the inverter voltage Vc or the coolant temperature ta is low. As a preferred example of the limit torque Tr, the continuously operable torque Tc described above can be given. By limiting the torque to the continuously operable torque Tc in this manner, the inverter can be prevented from overheating.

As a result, the capability of the rotating electrical machine can sufficiently be utilized while suitably suppressing the temperature increase of the inverter. Stall detection unit The stall detection unit 16 detects whether the vehicle is in a stalled state. As described above, in the case where an absolute value |N| of a rotational speed N of the rotor Ro2 of the second rotating electrical machine MG2 calculated based on the sensor output of the second rotating electrical machine rotational speed sensor Se2 is less than or equal to a predetermined value N0 (for example, 30 rpm) and the absolute value of the requested torque Tn of the rotating electrical machine MG2 is greater than or equal to a predetermined value, it is determined that the vehicle is in a stalled state. In other cases, it is determined that the vehicle is in a non-stalled state.

Hereinafter, regarding the operation control of the rotating electrical machines MG1 and MG2 in the vehicle drive system 200 described above, the torque limit control will be described with reference to FIGS. 6 and 7.

Figure 6:
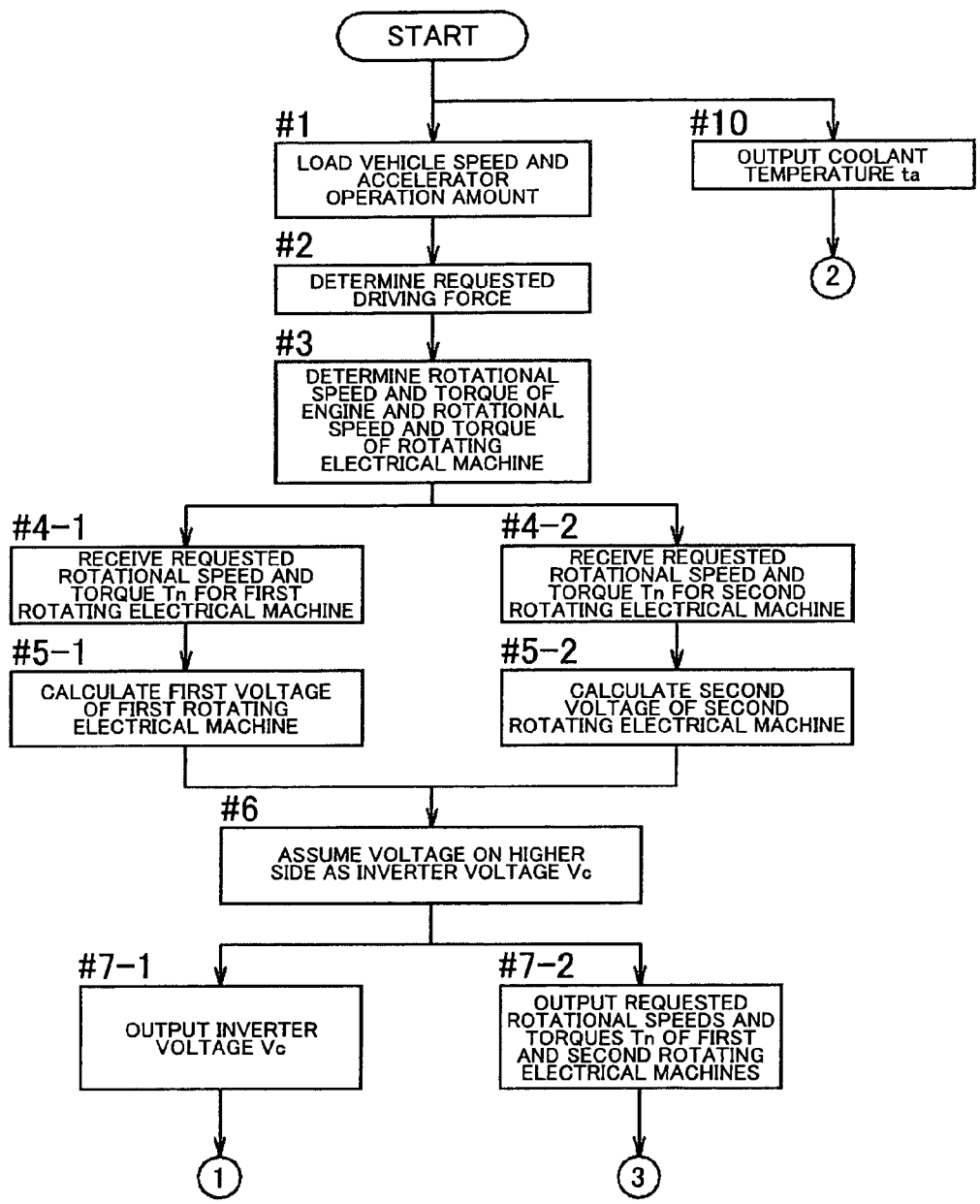
FIG. 6 is a flowchart showing an exemplary method for obtaining an inverter voltage.
Figure 7:
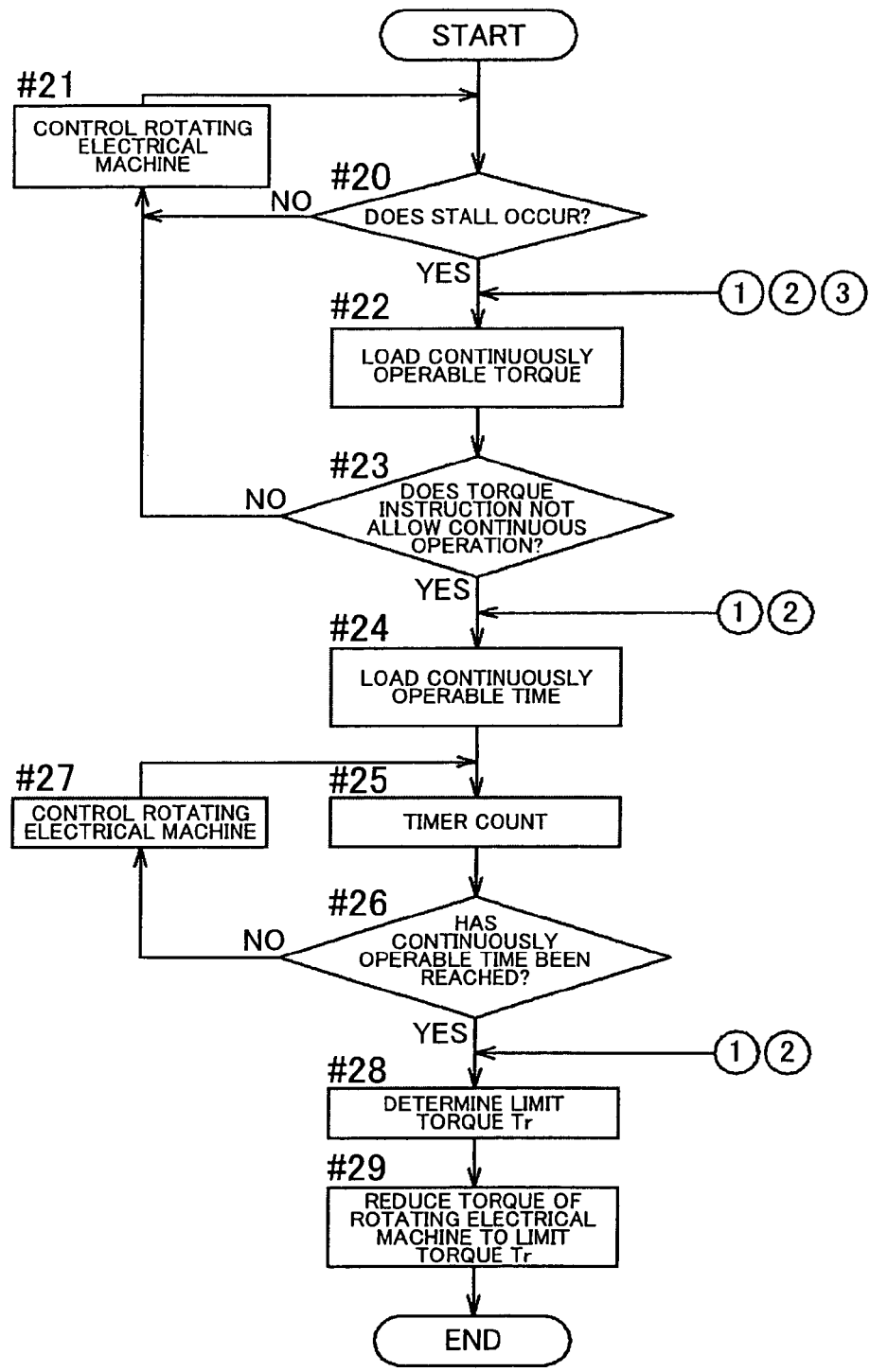
FIG. 7 is a flowchart showing an exemplary method for a torque limit control.

The flowcharts shown in FIGS. 6 and 7 are successively executed at predetermined time intervals along with an on-operation by an ignition key (not shown) provided in the vehicle until an off-operation by the key is performed. FIG. 6 is a flowchart showing an exemplary method for determining the rotational speed and the requested torque for each of the rotating electrical machines MG1 and MG2 by the driving condition determination unit 12 and determining and outputting the inverter voltage Vc by the rotating electrical machine control unit 14. Also, in the system, the coolant temperature sensor Se9 detects the coolant temperature for use in the torque limit control. FIG. 7 is a flowchart showing an exemplary method regarding the torque limit control mainly by the torque limit unit 15. In each stage shown by a circled number in the process of the torque limit control by the torque limit unit 15, various corresponding information at that point is loaded. Information shown by a circled number 1 is information of the inverter voltage Vc sequentially obtained by the rotating electrical machine control unit 14, information shown by a circled number 2 is information of the coolant temperature ta sequentially detected by the coolant temperature sensor Se9, and information shown by a circled number 3 is information of the requested torques Tn for the rotating electrical machines MG1 and MG2 sequentially determined by the driving condition determination unit 12.

In the torque limit control, the torque limit unit 15 successively determines the necessity of the torque limit control with respect to requested torque Tn requested for the rotating electrical machines MG1 and MG2 in correspondence with the driving state of the vehicle. In the case where it is determined as necessary, the torques of the rotating electrical machines MG1 and MG2 are reduced to the limit torque Tr (for example, the continuously operable torque Tc) lower than the requested torque Tn to terminate the limitation control.

2-1. Determination of Inverter Voltage Instruction and Torque Instruction

As shown in FIG. 6, the control device ECU loads speed information from the vehicle speed sensor Se5 and operation information of the accelerator from the accelerator operation detection sensor Se6 (step #1). The driving state of the vehicle is detected from these pieces of information, and the requested driving force at this point is simultaneously determined by the requested driving force determination unit 11 (step #2). The driving condition determination unit 12 determines the driving force to be supplied by the engine E and the respective rotating electrical machines MG1 and MG2 (step #3). For the rotating electrical machines MG1 and MG2, the rotational speed and the torque are determined. These pieces of information are sent to the rotating electrical machine control unit 14 (steps #4-1 and #4-2). The rotating electrical machine control unit 14 calculates the first voltage and the second voltage for obtaining the rotational speed and the torque requested for each of the rotating electrical machines MG1 and MG2 (steps #5-1 and #5-2). Of the calculated pair of the first voltage and the second voltage, an inverter voltage on the higher side is assumed as the inverter voltage Vc (step #6). This is to ensure a good operation of at least one of the pair of the rotating electrical machines MG1 and MG2 that requires the voltage on the higher side.

The inverter voltage Vc determined in this manner and the rotational speed and the requested torque Tn for each of the rotating electrical machines MG1 and MG2 are appropriately sent to the torque limit unit 15 (steps #7-1 and #7-2).

The inverter voltage Vc is a voltage as a target of the voltage conversion by the voltage conversion portion 4 provided in the inverter In. Further, in the present invention, the inverter voltage Vc is a voltage as a factor in determining the continuously operable torque Tc, the continuously operable time Ti0, and the limit torque Tr to be reached as a result of the torque limitation in the case where the torque limitation is executed, which have been described above regarding the torque limit unit 15.

As shown on the right side of the flowchart in FIG. 6, the coolant temperature is acquired by the control device ECU as information necessary for the torque limit control, and can be used on the torque limit unit 15 side (step #10).

2-2. Stall Determination

On the main flow side of the torque limit control shown in FIG. 7, the stall detection unit 16 determines whether the vehicle is in a stalled state (step #20). In the case where the vehicle is not in the stalled state (step #20: No), the control device ECU outputs the rotational speed and the requested torque Tn of each of the rotating electrical machines MG1 and MG2 separately obtained to the inverter In, and controls each of the rotating electrical machines MG1 and MG2 in accordance with the rotational speed and the requested torque Tn. That is, the rotating electrical machines MG1 and MG2 are operated in accordance with the driving conditions determined by the driving condition determination unit 12 without performing the torque limit control by the control device ECU in particular (step #21).

2-3. Torque Limit Control

In the case where the vehicle is in the stalled state (step #20: Yes), the torque limit unit 15 determines the necessity of the torque limit control. That is, based on the inverter voltage Vc and the coolant temperature ta at the point of the start of the stalled state of the vehicle, the torque limit unit 15 determines whether the requested torque Tn for each of the rotating electrical machines MG1 and MG2 at that point is less than or equal to the continuously operable torque Tc (steps #22 and #23). Thus, it is determined whether the operation control of the rotating electrical machines MG1 and MG2 can be continued continuously with the requested torque Tn even after the stall starting point. Specifically, the torque limit unit 15 refers to the inverter voltage Vc and the coolant temperature ta at that point simultaneously with the determination of the stalled state, determines whether the requested torque Tn is equal to or lower than the continuously operable torque Tc shown in FIG. 4 according to the map shown in FIG. 4 from these pieces of information, and determines that a continuous operation is impossible if the requested torque Tn is higher than the continuously operable torque Tc, or determines that the continuous operation is possible in the case where the requested torque Tn is equal to or lower than the continuously operable torque Tc (step #23).

In the case where the requested torque Tn is a torque by which the continuous operation is possible (step #23: No), since the load on the rotating electrical machines MG1 and MG2 is small even though in the stalled state, the conducted electricity amount of the switching element is small and the heating value is small. Therefore, the control device ECU performs the operation control of the rotating electrical machines MG1 and MG2 with the requested torque Tn (step #21).

With this configuration, the operation control is performed such that the continuously operable torque Tc determined based on the inverter voltage Vc and the coolant temperature ta and the requested torque Tn are compared, and the rotating electrical machine generates the requested torque Tn based on the comparison result. Thus, the operation control of the rotating electrical machines MG1 and MG2 can be performed in accordance with the requested torque Tn determined by the driving condition determination unit 12 while sufficiently protecting the inverter In. As a result, a driving state suitable for the vehicle in which the torque limitation is not applied can be maintained in a state where the protection of the inverter In is ensured.

On the other hand, when the requested torque Tn is higher than the continuously operable torque Tc (step #23: Yes), since the load on the rotating electrical machines MG1 and MG2 is large, the conducted electricity amount of the switching element is large and the heating value is large. Therefore, the rotating electrical machines MG1 and MG2 are controlled with the requested torque Tn at the stall starting point, for the continuously operable time Ti0 determined based on the requested torque Tn and the inverter voltage Vc and the coolant temperature ta at that point. Specifically, based on the requested torque Tn at the stall starting point, the inverter voltage Vc, and the coolant temperature ta, the continuously operable time Ti0 with the requested torque Tn is obtained according to the map as shown in FIG. 5 (step #24). That is, in the case where the requested torque Tn at the stall starting point is Tn0, the inverter voltage is Vc0, and the coolant temperature is ta0, the continuously operable time is obtained as time0 from FIG. 5. Accordingly, the continuously operable time Ti0 with the requested torque Tn increases as the inverter voltage Vc decreases, and the continuously operable time Ti0 with the requested torque Tn increases as the coolant temperature ta decreases.

The control device ECU controls the rotating electrical machines MG1 and MG2 with the requested torque Tn at the stall starting point until the obtained continuously operable time Ti0 has elapsed (steps #25, #26, and #27). Specifically, if the timer is zero, the timer starts counting up, and the operation control of the rotating electrical machines MG1 and MG2 is performed with the requested torque Tn (step #27) until the timer reaches the continuously operable time Ti0 (step #26: No).

2-4. Torque Reduction

When the timer reaches the continuously operable time Ti0 (step #26: Yes), the torque limit unit 15 performs the operation control of the rotating electrical machines MG1 and MG2 with the limit torque Tr that is the torque reduced from the requested torque Tn. Specifically, the limit torque Tr which is lower than the current requested torque Tn by the reduction amount ΔT obtained in accordance with the inverter voltage Vc and the coolant temperature ta is determined (step #28). As the limit torque Tr, the continuously operable torque Tc described above may be employed.

As shown in FIG. 4, the continuously operable torque Tc depends on the inverter voltage Vc and the coolant temperature ta, and the continuously operable torque Tc increases as the inverter voltage Vc and the coolant temperature ta decrease. Therefore, with the predetermined requested torque Tn, the reduction amount ΔT decreases as the inverter voltage Vc and the coolant temperature ta decrease, and increases as the inverter voltage Vc and the coolant temperature ta increase. Obviously, the limit torque Tr may be a torque lower than the continuously operable torque Tc. The control device ECU controls the rotating electrical machines MG1 and MG2 with the obtained limit torque Tr (step #29). In this manner, the rotating electrical machines MG1 and MG2 are operated with the limit torque Tr in which the torque is reduced.

As shown later in FIGS. 8 and 9, the shift from the requested torque Tn to the limit torque Tr is performed by gradually reducing the torque.

3. Torque Limit Control in Practice

Next, the change of the torque in the rotating electrical machines MG1 and MG2 in a time region in the case where the torque limit control described above is performed will be described. In the description below, the inverter voltage Vc and the coolant temperature ta will be described separately for an easier understanding. FIG. 8 shows a case where the inverter voltage Vc is not constant, and FIG. 9 corresponds to a case where the coolant temperature ta is not constant. In the drawings, the abscissa shows the time, and the ordinate shows the inverter temperature or the torque. The zero point of the abscissa corresponds to the occurrence point of the stall. In the ordinate, a temperature limit value t1 is shown as a limit value of the temperature accepted by the inverter. Further, thin solid lines extending in the horizontal direction show the torques of the rotating electrical machines MG1 and MG2, and show the requested torque Tn and the limit torque Tr.

3-1. Torque Limit Control in Accordance with Inverter Voltage

FIG. 8 shows a case where the temperature of the inverter In at the time of the occurrence of the stall is the temperature at the origin, and the temperature increase rate differs depending on the level of the inverter voltage Vc. In this embodiment, it is assumed that the temperature increase rate of the switching element forming the inverter In increases as the inverter voltage Vc increases.

In the drawing, a bold dotted line corresponds to a state where the inverter voltage Vc is high and the temperature increase is rapid. In this state, the temperature reaches the temperature limit value t1 in a short period of time. Thus, the continuously operable time Ti0 (time1) in this case is short. A bold solid line corresponds to a state where the inverter voltage Vc is low and the temperature increase is moderate. In this state, the temperature reaches the temperature limit value t1 at a slower rate. Thus, the continuously operable time Ti0 (time2) in this case is longer compared to the case where the inverter voltage Vc is high.

For example, in the case where the vehicle climbing a slope is brought to the stalled state with an equal balance of a backward force due to its weight and a forward force by the torque of the rotating electrical machine MG2 and the requested torque Tn at that point is larger than the continuously operable torque Tc with respect to the inverter voltage Vc at that point, the continuously operable time (time1) is obtained and the timer starts to count up. Until the timer reaches the continuously operable time (time1), the torque of the rotating electrical machine is maintained as the requested torque Tn.

When the timer reaches the continuously operable time (time1), a limit torque Tr1 is determined, and the torque of the rotating electrical machine is gradually decreased to the limit torque Tr1.

A case where the inverter voltage Vc is low follows approximately the same pattern. However, in the case where the inverter voltage Vc is low, the continuously operable time (time2) increases as described above, and a limit torque Tr2 is set as a torque higher than the limit torque Tr1 of the case where the inverter voltage Vc is high (but naturally lower than the requested torque Tn). When the continuously operable time (time2) has elapsed, the torque of the rotating electrical machine is decreased from the requested torque Tn to the limit torque Tr.

Thus, driving with the requested torque Tn originally requested for the rotating electrical machine MG2 is made possible for a longer period of time (continuously operable time) as the inverter voltage Vc decreases, and the rotating electrical machine MG2 can further be operated with a torque close to the requested torque Tn also after the continuously operable time Ti0 corresponding to the requested torque Tn has elapsed. This means that the time during which a hybrid vehicle can be operated with the requested torque Tn requested for the rotating electrical machine MG2 while the engine E is operated in a suitable state at the optimum fuel efficiency is significantly increased from the related art, and therefore this is highly advantageous.

3-2. Torque Limit Control in Accordance with Coolant Temperature

In a situation where the coolant temperature ta differs, the temperature of the inverter In generally differs. FIG. 9 shows that there is a difference in the temperature of the inverter at the occurrence point of the stall between cases where the coolant temperature ta is high and low.

In the drawing, a bold dotted line shows a state where the coolant temperature ta is high and the temperature of the inverter at the stall occurrence point is high, and a bold solid line shows a state where the coolant temperature ta is low and the temperature of the inverter at the stall occurrence point is low. In the case where the coolant temperature ta is high, the increase rate of the temperature is faster than in the case where the coolant temperature ta is low.

In the state where the coolant temperature ta is high, the temperature reaches the temperature limit value t1 in a short period of time. Thus, the continuously operable time Ti0 (time3) in this case is short. On the other hand, in a situation where the coolant temperature ta is low, the temperature reaches the temperature limit value t1 at a slower rate since the temperature of the inverter is naturally low. Thus, the continuously operable time Ti0 (time4) in this case is longer compared to the case where the coolant temperature is high.

For example, in the case where the vehicle climbing a slope is brought to the stalled state with an equal balance of a backward force due to its weight and a forward force by the torque of the rotating electrical machine MG2, and the requested torque Tn at that point is larger than the continuously operable torque Tc with respect to the coolant temperature ta at that point, the continuously operable time (time3) is obtained (step #24) and the timer starts to count up. Until the timer reaches the continuously operable time (time3), the torque of the rotating electrical machine is maintained as the requested torque Tn. When the continuously operable time (time3) is reached, a limit torque Tr3 is determined, and the torque of the rotating electrical machine is gradually decreased to the limit torque Tr3.

A case where the coolant temperature is low follows approximately the same pattern. However, in the case where the coolant temperature ta is low, the continuously operable time (time4) increases as described above, and a limit torque Tr4 is set as a torque higher than the limit torque Tr3 of the case where the coolant temperature ta is high. When the continuously operable time (time4) has elapsed, the torque of the rotating electrical machine is decreased from the requested torque Tn to the limit torque Tr4.

Thus, driving with the requested torque Tn originally requested for the rotating electrical machine MG2 is made possible for a longer period of time (continuously operable time) as the coolant temperature ta decreases, and the rotating electrical machine can further be operated with a torque close to the requested torque Tn also after the continuously operable time Ti0 corresponding to the requested torque Tn has elapsed. This means that the time range during which a hybrid vehicle can be operated with the requested torque requested for the rotating electrical machine while the engine is operated in a suitable state at the optimum fuel efficiency is significantly increased from the related art, and therefore this is highly advantageous.

Although the inverter voltage Vc and the coolant temperature ta have been separately described above, the torque limit control may be performed in consideration of both of them. In this case, factors causing different coolant temperatures correspond to different positions of intercepts of temperature on the ordinate side and different inclination angles as shown in FIG. 9. In the temperature behavior shown by a slope line in FIG. 8, the difference in the inverter voltage appears as a difference in the temperature increase rate. More specifically, the lines of different slopes shown in FIG. 8 indicate that different inclination angles result in different ordinate intercepts and inclinations in accordance with the coolant temperature. Thus, temperature slope lines are drawn with different inclinations in accordance with the inverter voltage. As a result, the time for reaching the temperature limit value is determined in accordance with the temperature slope line. Thus, the torque limit control from the requested torque to the limit torque can be executed, and an appropriate torque is set also for the limit torque in accordance with the inverter voltage and the coolant temperature.

Other Embodiments (1) In the embodiment described above, an example has been shown in which the vehicle is a hybrid vehicle including the rotating electrical machine as the drive source and a drive source (engine) other than the rotating electrical machine. However, since the present invention covers systems including a rotating electrical machine of which the drive control is performed by an inverter, the drive source may be only the rotating electrical machine. That is, it may be applied to an electric vehicle as the vehicle having the so-called rotating electrical machine as the drive source.

(2) In the embodiment described above, an example has been shown in which the hybrid vehicle includes the pair of rotating electrical machines, one rotating electrical machine operating as the motor and the other rotating electrical machine operating as the generator. However, the present invention may be applied to an arbitrary hybrid vehicle including a single rotating electrical machine having a mode of operating as a motor.

(3) In the embodiment described above, an example has been shown in which the torque limit control is applied under condition of the occurrence of the stalled state. However, in order to protect the inverter and particularly to protect individual switching elements, the torque limit control may be applied to a system including a control device (specifically, the driving condition determination unit which obtains the torque requested for the rotating electrical machine and the torque limit unit of the present invention) for the purpose of appropriately protecting the inverter, regardless of the occurrence of the stalled state, even in a normal driving state not in the stalled state.

(4) In the embodiment described above, the "continuously operable torque" has been the reference for starting the torque limit control. However, for example, it is also acceptable that a torque within a certain range with respect to the continuously operable torque is set as a torque limit control starting torque, and the torque limit control is started with the torque limit control starting torque as the reference.

(5) In the embodiment described above, the torque limit control causes the torque to be reduced after the "continuously operable time" has elapsed. However, the torque reduction may be performed before the elapse of the continuously operable time.

(6) In the embodiment described above, an example has been shown in which the torque is reduced to less than or equal to the "continuously operable torque" in the torque reduction. However, by employing an arbitrary torque lower than the requested torque in the present driving situation as the limit torque, the inverter can be protected to some degree.

(7) In the embodiment described above, an example has been shown in which the "continuously operable torque" and the "continuously operable time" are obtained from the maps obtained in advance. However, they may be obtained from arithmetic expressions obtained in advance.

A rotating electrical machine control system is obtained which can operate a rotating electrical machine with an operation condition required for the rotating electrical machine with minimum torque limitation and which can sufficiently protect an inverter that controls the rotating electrical machine.

According to an exemplary aspect of the invention, the torque limit unit limits (reduces) the torque of the rotating electrical machine as necessary, and changes a limit of the torque in accordance with the voltage (which is also a voltage applied to the rotating electrical machine controlled by the inverter) applied to the frequency conversion portion provided in the inverter. Normally, in a system including a rotating electrical machine, the torque requested for the rotating electrical machine is a torque in accordance with the intended purpose of the employed system. For example, in the case of an electric vehicle, the rotating electrical machine is required to generate a torque that generates a driving force required for the vehicle. In the case of a hybrid vehicle, the rotating electrical machine operating as a motor is required to generate a torque in an amount according to the driving state.

According to a study by the inventors of the present invention, the voltage applied to the frequency conversion portion provided in the inverter influences the temperature of the switching element forming the frequency conversion portion. For example, the inverter voltage closely relates to a continuously operable torque which is a torque that causes no problem in the inverter (and consequently the switching element) when the rotating electrical machine controlled by the inverter is continuously operated with a predetermined torque, and to a continuously operable time that causes no problem in the inverter when the rotating electrical machine is operated with a torque higher than the continuously operable torque. As the inverter voltage decreases, the continuously operable torque increases significantly, and the continuously operable time increases significantly in a similar manner.

Thus, in the present invention, the form of the torque limit control executed by the torque limit unit depends on the inverter voltage. Accordingly, the rotating electrical machine can be used in a region well before the torque limitation is to be applied in terms of the inverter voltage or the degree of torque limitation can be reduced further more compared to the related art. Thus, while the inverter is appropriately protected, the rotating electrical machine can be operated in a requested suitable state as much as possible.

According to an exemplary aspect of the invention, whether to apply the torque limitation is determined based on the relation with the continuously operable torque, and the continuously operable torque is associated with the inverter voltage. As described above, in the study conducted by the inventors, the continuously operable torque has a strong relation with the inverter voltage. Thus, by performing the torque limit control when the requested torque is higher than the continuously operable torque obtained in accordance with the inverter voltage, and by operating the rotating electrical machine in accordance with the requested torque when the requested torque is lower than the continuously operable torque, the inverter can be protected in consideration of the inverter voltage and the operation of the rotating electrical machine requested from the control device side can be realized.

According to an exemplary aspect of the invention, the continuously operable torque in accordance with the inverter voltage decrease as the inverter voltage increases. This is because the torque acceptable for the rotating electrical machine decreases since the inverter (specifically, each switching element) tends to generate heat along with an increase in the inverter voltage. Thus, the possibility of executing the torque limit control increases as the inverter voltage increases, and decreases as the inverter voltage decreases. However, compared to cases of the related art where the torque limit control has been performed irrespective of the inverter voltage, unnecessary application of the torque limitation can be prevented whereas appropriate torque limitation can be applied when necessary.

According to an exemplary aspect of the invention, by limiting the torque to the limit torque lower than the requested torque and setting the limit torque as a torque equal to or lower than the continuously operable torque, the heat generation of the inverter can be suppressed to reliably protect the inverter.

According to an exemplary aspect of the invention, a reduction amount from the requested torque to the limit torque is changed in accordance with the inverter voltage and that the reduction amount increase as the inverter voltage increases.

As described above, the necessity for the torque limitation increases as the inverter voltage increases. By causing the reduction amount to depend on the inverter voltage in the case where the torque is reduced to the limit torque lower than the requested torque and increasing the reduction amount as the inverter voltage increases, an increase in the inverter temperature which tends to occur due to high inverter voltage can be well suppressed.

According to an exemplary aspect of the invention, the torque limit control takes a form of decreasing the torque of the rotating electrical machine to the limit torque that is the torque lower than the requested torque after the continuously operable time has elapsed. In this case, the rotating electrical machine is operated with the requested torque until the continuously operable time has elapsed, and the continuously operable time itself is in accordance with the inverter voltage. In the case where the rotating electrical machine is operated with the requested torque and the requested torque is higher than the continuously operable torque described above, the continuously operable time acceptable for the inverter and consequently the rotating electrical machine with the requested torque naturally has a limit, and the continuously operable time has a close relation with the inverter voltage. Thus, in this configuration, an accurate torque limit control can be performed by obtaining the continuously operable time in accordance with the inverter voltage and reducing the torque after this time has elapsed. In the study conducted by the inventors, compared to the continuously operable time determined based on only the torque value, the temperature of the inverter, and the coolant temperature, the time can be made longer, and a time in which the rotating electrical machine can be operated with a requested torque preferable for the system can be made longer by taking the inverter voltage into consideration as a determination factor.

The continuously operable time decreases as the inverter voltage increases. This is because, when operated at a constant torque, the time decreases as the inverter voltage increases.

Further, by employing a configuration in which the torque is continuously changed over time when the torque is reduced from the requested torque to the limit torque, a sudden change in the torque generated by the rotating electrical machine does not occur. Thus, a shock or the like does not occur.

According to an exemplary aspect of the invention, by providing the voltage conversion portion in the inverter, it becomes possible to increase the DC voltage from the DC power supply and pass on the DC voltage to the frequency conversion portion to increase the operation range of the rotating electrical machine.

Although an increase in the inverter voltage causes an increase in the degree of influence on the "continuously operable torque" and the "continuously operable time" described above, good operation states of the inverter and the rotating electrical machine can be ensured even in a pressurizing structure in the rotating electrical machine control system including the voltage conversion portion, by employing the configuration of the present invention.

According to an exemplary aspect of the invention, by adding a factor of the cooling capability of the cooling unit to the factor of the inverter voltage when executing the torque limit control, an accurate torque limit control in consideration of both factors can be executed, and the operation state of the rotating electrical machine requested by the system can be ensured while reliably protecting the inverter.

Further, by structuring a vehicle drive system including the rotating electrical machine control system described above, and a stall detection unit which detects a stalled state of a vehicle, in which the torque limit unit is operated in a case where the stall detection unit detects that the vehicle is in the stalled state, the problem in the inverter protection which tends to occur at the time of a stall can reliably be avoided.

According to an exemplary aspect of the invention, the driving force on one side distributed by the power distribution mechanism is transmitted to a wheel while the driving force on another side is transmitted to the first rotating electrical machine, and a driving force generated by the second rotating electrical machine is transmitted to the wheel. The control device determines the rotational speed and the requested torque requested for each of the first rotating electrical machine and the second rotating electrical machine. A larger voltage of a first voltage determined based on the rotational speed and the requested torque requested for the first rotating electrical machine and a second voltage determined based on the rotational speed and the requested torque requested for the second rotating electrical machine is assumed as the inverter voltage.

The vehicle drive system of this configuration includes the drive source (for example, the engine) other than the pair of rotating electrical machines, and the pair of rotating electrical machines. In a so-called hybrid vehicle which performs power distribution in split form, the operation of the pair of rotating electrical machines is realized in a form satisfying the rotational speed and torque requested for the rotating electrical machines. Further, a system having a form in which the voltage necessary for each of the pair of rotating electrical machines is obtained by the voltage conversion portion of a single inverter can easily be realized.

According to an exemplary aspect of the invention, a hybrid vehicle in which power distribution in split form is performed using a single planetary gear mechanism can easily be realized.

Further, also in the hybrid vehicle in which power distribution in split form is performed, the problem in the inverter protection which tends to occur at the time of a stall can reliably be avoided by structuring the vehicle drive system including the stall detection unit which detects the stalled state of the vehicle, in which the torque limit unit is operated in the case where the stall detection unit detects that the vehicle is in the stalled state.

In the present invention, an accurate temperature estimation in correspondence with the inverter voltage can be executed by employing a temperature estimation method for a frequency conversion portion in a rotating electrical machine control system including a DC power supply, a rotating electrical machine, an inverter provided between the DC power supply and the rotating electrical machine to control current flowing in the rotating electrical machine, and a control device which determines a rotational speed as a rotational speed requested for the rotating electrical machine and a requested torque as a torque requested for the rotating electrical machine, in which the inverter is operated based on the rotational speed and the requested torque determined by the control device. The temperature estimation method includes estimating that a temperature increase rate of a switching element forming the inverter is faster with a higher inverter voltage which is a voltage applied to the frequency conversion portion provided in the inverter.

What is claimed is:

1. A rotating electrical machine control system comprising:
   a DC power supply;
   a rotating electrical machine;
   an inverter provided between the DC power supply and the rotating electrical machine to control current flowing in the rotating electrical machine; and
   a control device that:
      determines a rotational speed as a rotational speed requested for the rotating electrical machine and a requested torque as a torque requested for the rotating electrical machine; and
      limits a torque of the rotating electrical machine, wherein:
   the inverter is operated based on the rotational speed and the requested torque determined by the control device,
   the control device changes a limit of the torque in accordance with an inverter voltage, which is a voltage applied to a frequency conversion portion provided in the inverter,
   the control device executes torque limit control that limits the torque of the rotating electrical machine when the requested torque is higher than a continuously operable torque determined in accordance with the inverter voltage, and prevents an increase in temperature of the frequency conversion portion even when the rotating electrical machine is operated continuously, and
   the rotating electrical machine is operated in accordance with the requested torque when the requested torque is lower than the continuously operable torque.

2. The rotating electrical machine control system according to claim 1, wherein the continuously operable torque determined in accordance with the inverter voltage decreases as the inverter voltage increases.

3. The rotating electrical machine control system according to claim 2, wherein, when the torque limit control is executed, the control device limits the torque of the rotating electrical machine to a limit torque which is a torque less than or equal to the continuously operable torque.

4. The rotating electrical machine control system according to claim 3, wherein the torque is continuously changed over time, when the torque is reduced from the requested torque to the limit torque.

5. The rotating electrical machine control system according to claim 2, wherein, when the torque limit control is executed, the control device limits the torque of the rotating electrical machine to a limit torque which is a torque lower than the requested torque after a continuously operable time changed in accordance with the inverter voltage has elapsed.

6. The rotating electrical machine control system according to claim 5, wherein the continuously operable time decreases as the inverter voltage increases.

7. The rotating electrical machine control system according to claim 5, wherein the torque is continuously changed over time, when the torque is reduced from the requested torque to the limit torque.

8. The rotating electrical machine control system according to claim 1, wherein:
   the inverter includes a voltage conversion portion, and
   based on the rotational speed and the requested torque, a DC voltage supplied from the DC power supply can be increased by the voltage conversion portion, converted to an AC voltage by the frequency conversion portion, and supplied to the rotating electrical machine.

9. The rotating electrical machine control system according to claim 1, further comprising:
   a cooling unit that cools the inverter, wherein:
   the control device changes the limit of the torque in accordance with the inverter voltage and a cooling capability of the cooling unit.

10. A vehicle drive system, comprising:
   the rotating electrical machine control system according to claim 1; and
   a stall detection unit that detects a stalled state of a vehicle, wherein:
   the control device is operated when the stall detection unit detects that the vehicle is in the stalled state.

11. A vehicle drive system, comprising:
   the rotating electrical machine control system according to claim 8;
   a first rotating electrical machine and a second rotating electrical machine as the rotating electrical machine; and
   a power distribution mechanism that distributes a driving force generated from a drive source other than the first rotating electrical machine and the second rotating electrical machine, wherein:
      the driving force on one side distributed by the power distribution mechanism is transmitted to a wheel while the driving force on another side is transmitted to the first rotating electrical machine, and a driving force generated by the second rotating electrical machine is transmitted to the wheel;
      the control device determines the rotational speed and the requested torque requested for each of the first rotating electrical machine and the second rotating electrical machine; and
      a larger voltage of a first voltage determined based on the rotational speed and the requested torque requested for the first rotating electrical machine and a second voltage determined based on the rotational speed and the requested torque requested for the second rotating electrical machine is assumed as the inverter voltage.

12. The vehicle drive system according to claim 11, wherein the power distribution mechanism includes a planetary gear mechanism including a first rotational component, a second rotational component, and a third rotational component in order of rotational speed; and
   the first rotating electrical machine is connected to the first rotational component, the drive source other than the rotating electrical machine is connected to the second rotational component, the second rotating electrical machine is connected to the third rotational component, and the third rotational component is connected to the wheel.

13. The vehicle drive system according to claim 12, further comprising:
a stall detection unit that detects a stalled state of a vehicle, wherein:
the control device is operated when the stall detection unit detects that the vehicle is in the stalled state.

14. A rotating electrical machine control system comprising:
a DC power supply;
a rotating electrical machine;
an inverter provided between the DC power supply and the rotating electrical machine to control current flowing in the rotating electrical machine; and
a control device that:
determines a rotational speed as a rotational speed requested for the rotating electrical machine and a requested torque as a torque requested for the rotating electrical machine; and
limits a torque of the rotating electrical machine, wherein:
the inverter is operated based on the rotational speed and the requested torque determined by the control device,
the control device changes a time at which the torque is limited and an amount by which the torque is limited in accordance with an inverter voltage, which is a voltage applied to a frequency conversion portion provided in the inverter,
the control device executes torque limit control that limits the torque of the rotating electrical machine when the requested torque is higher than a continuously operable torque determined in accordance with the inverter voltage, and prevents an increase in temperature of the frequency conversion portion even when the rotating electrical machine is operated continuously, and
the rotating electrical machine is operated in accordance with the requested torque when the requested torque is lower than the continuously operable torque.

15. The rotating electrical machine control system according to claim 14, wherein the time at which the torque is limited decreases as the inverter voltage increases.

16. The rotating electrical machine control system according to claim 14, wherein the amount by which the torque is limited increases as the inverter voltage increases.

17. The rotating electrical machine control system according to claim 14, further comprising:
a cooling unit that cools the inverter, wherein:
the control device further changes the time at which the torque is limited and the amount by which the torque is limited in accordance with a cooling capability of the cooling unit.

* * * * *